Oct. 14, 1930.  F. MEYER  1,778,332
TRAVELING MEAT HOOK
Filed May 28, 1929
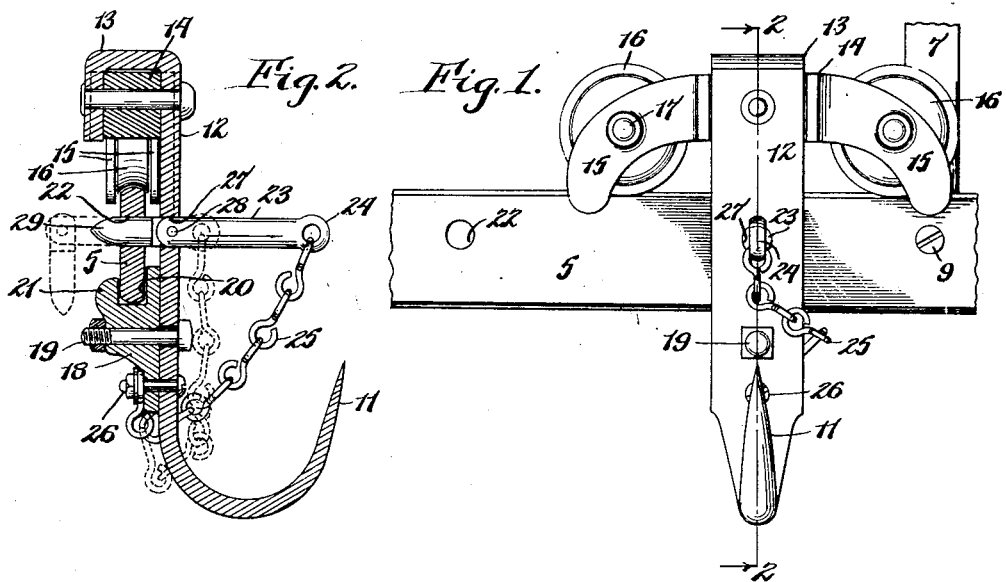
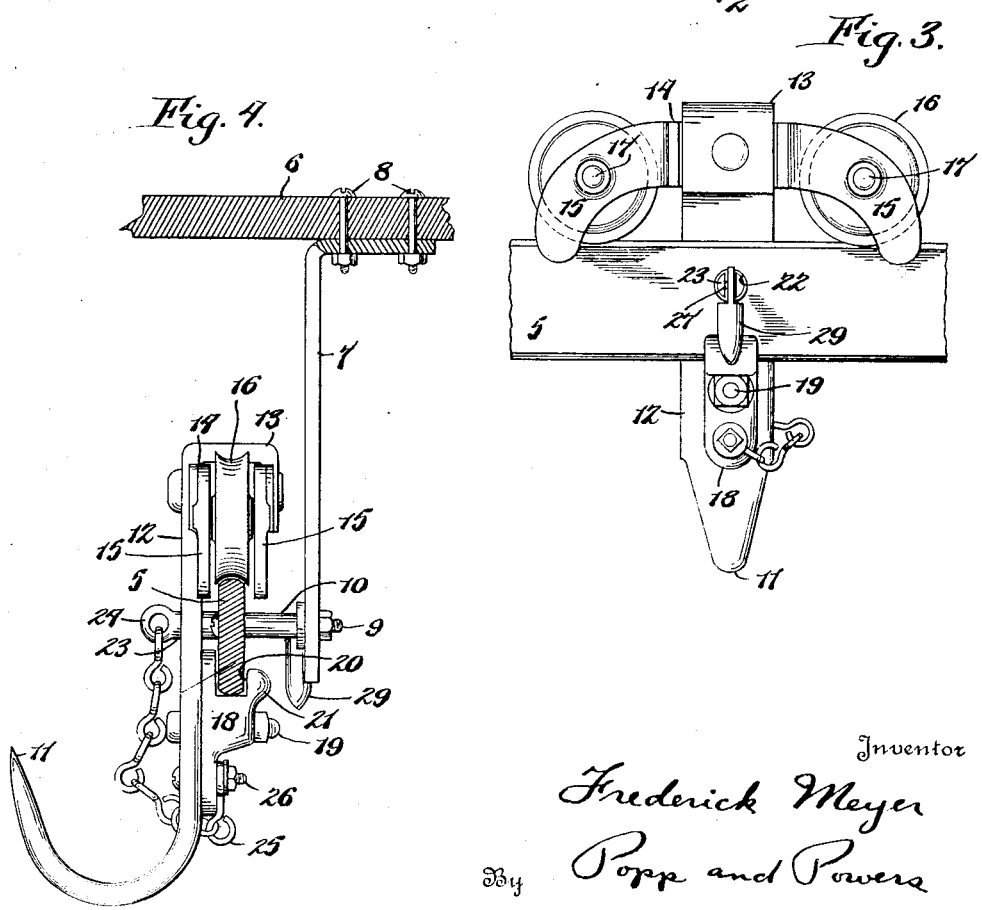
Inventor
Frederick Meyer
By Popp and Powers
Attorneys Patented Oct. 14, 1930

1,778,332

UNITED STATES PATENT OFFICE

FREDERICK MEYER, OF BUFFALO, NEW YORK, ASSIGNOR TO MEYER BODY COMPANY, INC., OF BUFFALO, NEW YORK, A CORPORATION OF NEW YORK

TRAVELING MEAT HOOK

Application filed May 28, 1929. Serial No. 366,718.

This invention relates to a traveling meat hook and more particularly to a traveling meat hook adapted to be supported on a rail within a refrigerated meat truck or railway car so that the meat can be placed on the hooks at the door and then rolled into the truck or car supported on the traveling meat hook and rail, although the traveling meat hook can also be used in other places where it is desirable to convey or store meat.

The principal object of this invention is to provide a traveling meat hook which will freely traverse the rail which supports it and which can be fixed or latched at different points along the rail so as to hold the suspended meat against movement along the rail. Such latching means are particularly important when the meat hooks are used in refrigerated automobile trucks since the swaying of the truck body tends to cause the meat hooks to tear the heavy pieces of meat and this tendency would be greatly increased if the meat hooks were free to travel back and forth along the rails as the truck sways or is stopped and started.

A further object is to provide such traveling meat hooks in which the latching means are of simple, durable and reliable construction and can be quickly and easily operated, thereby reducing the time necessary to load and unload meat from the refrigerator car or truck.

Another aim is to provide such traveling meat hooks in which provision is made to insure the free movement of the hooks along the rails and to prevent the meat hooks from jumping the rails or becoming deranged thereon or swaying unduly.

A further purpose is to provide such a meat hook which is simple and sturdy in construction, can easily be kept in a satisfactory condition and is inexpensive to make and can therefore be sold at a low price.

In the accompanying drawings:

Figure 1 is a front elevation of a meat hook made in accordance with my invention and mounted on a rail.

Figure 2 is a vertical section taken on line 2—2, Fig. 1, and showing the latching means or bolt partly withdrawn, the latched or operative position of the latching bolt being shown in dotted lines.

Figure 3 is a rear elevation of the traveling meat hook.

Figure 4 is a transverse section through the rail showing the same suspended by a hanger from the roof of a refrigerated truck body and showing a side elevation view of a traveling meat hook thereon.

Similar reference numbers refer to like parts in each view.

In its general organization this invention comprises a meat hook having lateral arms carrying wheels which are adapted to ride along a rail suspended from the roof of a refrigerated truck, guard means embracing the rails to insure the retention of the traveling hook on the rail and a latch bolt which is secured to the hook and is adapted to removably enter one of a series of spaced holes in the rail so that when so fastened the meat hook is held against movement along the rail.

The horizontal rail 5 on which the meat hook travels is shown as made of flat bar stock and preferably terminates near the door or entrance (not shown) of the refrigerated truck or car so that the pieces of meat can be hung on the meat hooks at the door or entrance and then rolled into the truck or car on the hooks. This rail 5 is shown as supported from the roof 6 of the truck body or car by a hanger 7 which is connected to the roof 6 by bolts 8 or in any other suitable manner. The rail 5 can be carried at the lower end of the hanger 7 in any suitable manner so as to be spaced a short distance therefrom, and is shown as connected by a bolt 9 and held in spaced relation by a spacing sleeve 10 which surrounds the bolt and is interposed between the hanger 7 and the rail 5.

The meat hook 11 is suitably formed to catch and hold the piece of meat to be supported and includes a flat body part 12 which extends upwardly and at its upper end is bent to form an inverted U-shaped end 13. Between the body part 12 of the hook and the reversely formed end 13 the central part of the carriage 14 is secured by means of a rivet or in any other suitable manner. This carriage 14 is preferably made of cast metal and is formed at its opposite ends to provide bifurcated arms 15 between which bifurcations the supporting wheels or rollers 16 are mounted, the axles 17 of these wheels being mounted in the bifurcated arms 15 in any usual and well known manner. The wheels 16 are preferably grooved so as to avoid the danger of running off the track or rail 5 on which they ride, and each of the bifurcated arms 15 overhangs the opposite sides of the rail 5 so as to act as a further guard in preventing the carriage from jumping or running off the track.

Below the rail 5 a grooved guard block 18 is secured to the body part 12 of the meat hook by means of a bolt 19. This guard block is provided on its upper side with a groove 20 in which the rail 5 rides and is preferably closely spaced from the rail so as to prevent upward displacement of the carriage from the rail 5. It is also apparent that the outer lip 21 of this guard block prevents forward or lateral tipping of the meat hook and its carriage and therefore keeps the meat hook and carriage in an upright operative position.

To latch the carriage and meat hook at different points along the rail 5, the rail is provided at spaced intervals with holes 22 which are adapted to receive latching means provided on each hook. This latching means comprises a bolt 23 which is provided at one end with an eye 24 to which eye is secured a retaining chain 25, the other end of this chain being secured to the meat hook by a bolt 26. This bolt 26 also serves to secure the guard block 18 to the body 12 of the meat hook. The latching bolt 23 is adapted to enter a hole 27 provided in the body of the hook, this hole being arranged to pass in front of the holes 22 in the rail so that the bolt can be passed through the hole 27 in the meat hook and one of the holes 22 in the rail 5 and thereby latch the meat hook against movement along the rail. By latching the loaded meat hooks in this manner, the heavy pieces of meat are prevented from shifting back and forth along the rail 5 as the truck is started and stopped and thereby avoids tearing of the meat from this shifting movement.

In order to prevent the bolt 23 from being accidentally jarred out, a retaining member 29 is pivoted to its outer or free end. This retaining member 29 is in the form of a tapered cylindrical head and is pivoted to the free end of the bolt by a pivot pin 28 in any suitable manner. In inserting the bolt, the operator lifts the head 29 so that it forms a straight continuation of the bolt 23. In this position both the head 29 and the bolt 23 can be passed through the registering openings 22 and 27 in the rail and hook, as best shown in Fig. 2. When the head 29 emerges on the rear side of the rail it drops into the dotted line position shown in Fig. 2 in which position it prevents the bolt 23 from being pulled out or accidentally jarred out. When it is desired to release the meat hooks to unload the meat, each head 29 is raised until it is parallel with the bolt 23, the bolt 23 and the head 29 are withdrawn and the hook is thereby unlatched and free to be rolled along the track to the door of the truck where the meat is unloaded from the hooks.

As a whole this invention provides a traveling meat hook, particularly adapted for use in refrigerator meat trucks, which is extremely simple, and inexpensive in construction, reliable in operation, it is adapted to support heavy loads for movement along a track, the hook is reliably held on the track and held against undue swaying or tipping and it can be quickly and conveniently latched at different points along the rail so as to hold the load stationary while it is being shipped.

I claim as my invention:

1. A device for movably supporting an article for movement along a rail, comprising a hook, means for movably supporting said hook on said rail, and means carried by said hook for latching said hook against movement along said rail comprising a member carried by said hook and adapted to be passed through one of a plurality of openings provided in said rail.

2. A device for movably supporting an article for movement along a rail, said rail having a plurality of openings, comprising a hook, means for movably supporting said hook on said rail and a pin carried by said hook and adapted to be moved into one of said openings for latching said hook at different stations along said rail.

3. A device for movably supporting an article for movement along a rail, said rail having a plurality of openings, comprising a hook having an opening adapted to register with each of the openings in said rail, a pin and a chain connecting said pin and said hook, said pin being adapted to be passed through the opening in said hook and one of the openings in said rail to latch said hook at different stations along said rail.

4. A device for supporting an article for movement along a rail, said rail having a plurality of openings, comprising a hook having an opening adapted to register with each of the openings in said rail, a pin, and a tapered head pivotally connected with one end of said pin, said head and pin, when straightened, being insertable horizontally through the opening in said hook and one of the openings in said rail to latch said hook at different stations along said rail, and said head dropping at an angle to said pin by gravity upon passing through said openings thereby to retain said pin in said openings.

5. A device for supporting an article for movement along a rail, said rail having a plurality of openings, comprising a carriage composed of a piece of metal formed to provide a pair of bifurcated arms, a channeled wheel mounted between the bifurcations of each of said arms and resting on said rail, the bifurcations of each of said arms being extended downwardly to pass along opposite sides of said rail, a hook having a U-shaped upper end embracing the central part of said carriage, a depending body part extending along one side of said rail and an upturned pointed end at the lower end of said body part, a guard block, means for securing said guard block to one side of the body part of said hook, said guard block having a groove receiving the lower edge of said rail thereby to prevent lateral and upward displacement of said hook relative to said rail and means for latching said hook at different stations along said rail comprising a pin adapted to be passed through an opening in the body part of said hook and one of the openings in said rail, a chain connecting one end of said pin and the means for fastening said guard block and a tapered head pivoted to the other end of said pin, said tapered head falling by gravity at an angle to said pin when inserted through said openings thereby to retain said pin in said openings.

6. A device for movably supporting an article on a rail, comprising an integral cast metal carriage having a solid central portion and two oppositely projecting bifurcated arms extending outwardly from the solid central portion, a wheel mounted between the bifurcations of each of said arms and adapted to engage the upper side of said rail, a hook having an upper inverted U-shaped part embracing the solid central portion of said carriage, a body part depending along one side of said rail and a pointed upturned hook at the lower end of said body part and a fastening member extending through the sides of said U-shaped upper part of said hook and the solid central part of said carriage.

In testimony whereof I hereby affix my signature.

FREDERICK MEYER.